Nov. 24, 1931.  C. HIRSCH  1,833,574
SEARCHLIGHT
Filed Oct. 10, 1930
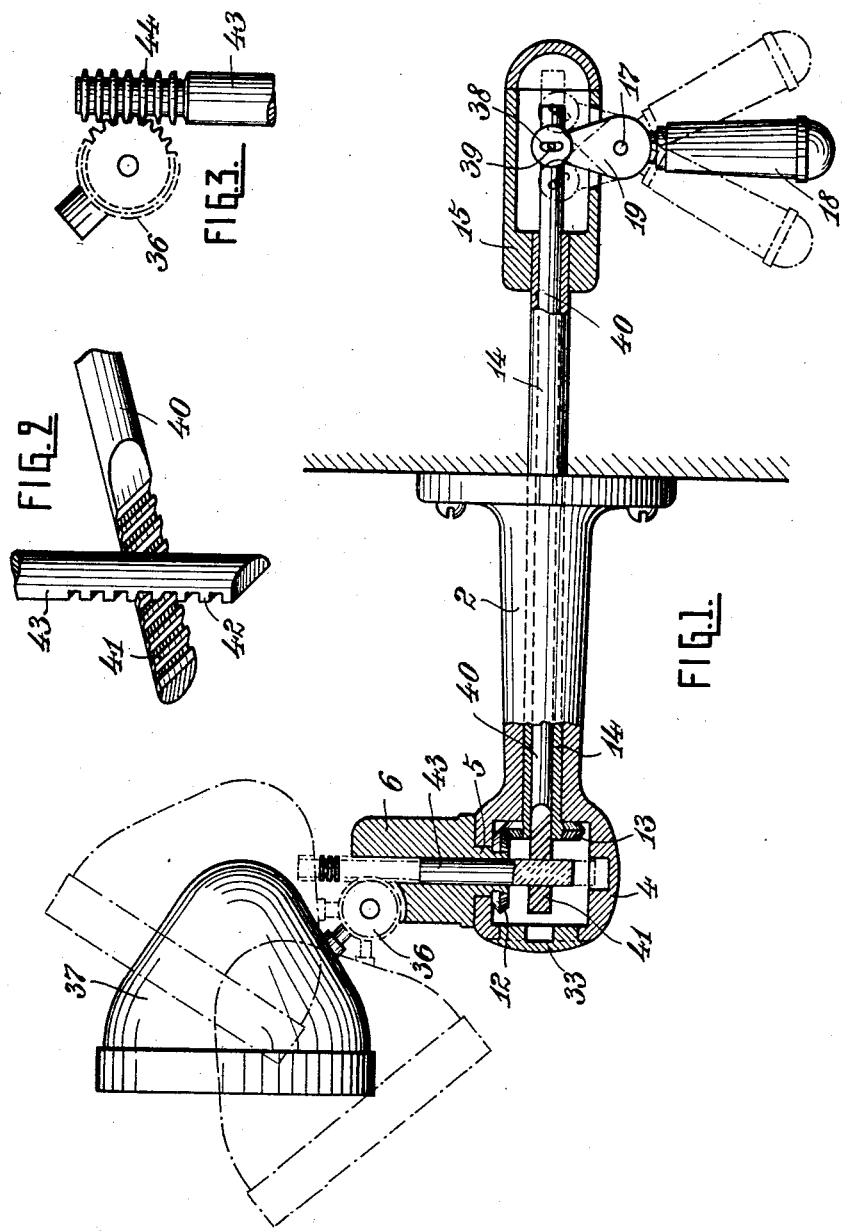
Inventor:
Carl Hirsch Patented Nov. 24, 1931

1,833,574

UNITED STATES PATENT OFFICE

CARL HIRSCH, OF LEIPZIG, GERMANY, ASSIGNOR TO HUGO SCHNEIDER AKTIENGESELL-SCHAFT, OF LEIPZIG, GERMANY

SEARCHLIGHT

Application filed October 10, 1930, Serial No. 487,777, and in Germany March 25, 1930.

This invention relates to an improvement of the searchlight acording to patent application Serial No. 465,628 filed July 3rd, 1930.

The searchlight of the above application is constructed in such a manner that the transmission of the handle movement, necessary for moving the searchlight in horizontal plane, is effected by a tube rigidly fixed in the casing of the oscillatable handle, which tube is rotatable in a supporting arm and carries on its front end of the driving wheel of a known pair of bevel wheels, the driven wheel of which is fastened on the lower pin of a universal joint-like searchlight bracket, whereas the transmission of the handle movement, necesary for moving the searchlight in vertical position, is effected by a pull rope or the like, fastened on the upper end of the two armed handle, which rope passes through the tube, runs over a guide roller mounted in the supporting arm head and engages on the upper joint part of the searchlight bracket.

Extensive practical experiments have shown that, when the searchlight is frequently used, the pull rope easily stretches, thus impairing the proper working of the searchlight, and for overcoming which it is necessary to dismantle same, so that in any case an interruption of service cannot be avoided. These disadvantages are overcome according to the invention in that the two armed handle is connected by a slot and pin to a known connecting rod shiftable in the rotary tube, which rod has on its end projecting over the driving bevel wheel, teeth arranged obliquely to the axis of the rod which teeth engage in a similarly toothed lower end of a rack, arranged at right angles thereto, shiftable in the rotatable searchlight bracket. and engaging with the teeth at its upper end in a toothed wheel carrying the searchlight and rotatable in the searchlight bracket. In this manner an extremely simple positively connected chain of elements is formed between the handle and the searchlight, which entirely prevents inaccurate working of the searchlight.

An embodiment of the invention is illustrated by way of example in the accompanying drawings in which:

Fig. 1 shows the searchlight in side elevation, partly in section,

Figs. 2 and 3 representing constructional details thereof.

Like the searchlight according to the main application, that according to the present invention has as a bearing part a supporting arm 2, which is fixed on the front wall of the car body and forms on its free end a hollow head 4. This head is closable at the front by a screw cover 33 and serves as bearing for a rotary bracket 6, which supports the searchlight 37 by means of a toothed wheel 36, mounted in a cut out portion of the bracket. The lower end of the bracket 6 has an extension 5 extending through the wall of the head 4, a bevel wheel 12 keyed on its lower end. This bevel wheel 12 meshes with a bevel wheel 13, keyed on the front end of a tube 14, freely rotatable in the supporting arm 2. The rear end of this tube 14 is rigidly fixed in a casing 15 which serves as bearing for a handle 18, 19 pivotable around a pin 17 and adapted to be turned therewith in a plane at right angles to the axis of the supporting arm.

The upper arm 19 of the two armed handle 18 grips with a slot 38 over a pin 39 of a connecting rod 40 freely shiftable in the bore of the tube 14. On its front end projecting over the driving bevel wheel 13 this connecting rod 40 is provided with oblique teeth, which are preferably arranged at an angle of 45° to the axis of the connecting rod. The oblique teeth 41 engage in correspondingly arranged, that is also oblique teeth 42 of a rack 43 standing at right angles to the connecting rod 40 and shiftable in the searchlight bracket 6, which rack 43 like the connecting rod 40 is of round cross section and has on its upper end circular teeth 44, by means of which it meshes in the toothed wheel 36. If the handle 18 is for example pressed forward, the connecting rod 40 is pulled back and thereby cooperates by means of the flanks of its teeth 41 directed towards the right according to Fig. 2, with the lower flanks of the oblique teeth 42 in such a manner, that the rack 43 is raised, so that the toothed wheel 36 is rotated in counter clockwise direction according to Fig. 1. The searchlight 37, carried by the toothed wheel 36, is consequently tilted forwards, whereas in the case of the handle 18 being oscillated in the opposite direction, the searchlight will be moved in the opposite direction. By turning the handle 18 at the same time in a plane at right angles to the axis of the supporting arm 2, the searchlight, whilst being moved in the vertical plane, can also be adjusted in the horizontal plane.

The connecting rod 40 and the rack 43, as already mentioned, are of round cross section, this presenting the advantage that they can be very simply mounted in a bore of the tube 14 and of the bracket 6 respectively. The connecting rod and the rack are both flattened at their ends, provided with oblique teeth, to one half their cross section, the flattened portions facing and at the same time guiding one another. The transmission of movement takes place in a common plane, extending exactly through the axis of the connecting rod and the rack.

If both the connecting rod 40 and the rack 43 are turned 180° in their bearings, the opposite movement of the searchlights will be effected with the same direction of movement of the handle as before, this being desirable in certain instances.

I claim:—

1. A searchlight comprising in combination with the searchlight, a bracket carrying said searchlight, a hollow arm supporting said bracket, a tube rotatable in said hollow arm, a connecting rod shiftable in said tube, a pin on the end of said rod, a two armed handle having a slot engaging with said pin, a driving bevel wheel at a distance from the end of said rod, teeth on the end of said rod, projecting beyond said bevel wheel oblique to the axis of said connecting rod, a rack shiftable in said searchlight bracket arranged at right angles to said connecting rod, teeth on the end of said rack oblique to the axis of said rack adapted to mesh with the teeth on said connecting rod, a toothed portion on the upper end of said rack, and a toothed wheel carrying said searchlight, rotatably mounted in said bracket adapted to engage with the toothed portion of said rack.

2. A searchlight as specified in claim 1, in which the conecting rod and the rack are of circular cross section and flattened to half their cross section at the end having inclined teeth, said flattened portions facing and adapted to guide one another.

3. A searchlight as specified in claim 1, in which the toothed portion of the rack cooperating with the toothed wheel carrying the searchlight, is provided with annular teeth.

4. A searchlight as specified in claim 1, in which the connecting rod and the toothed rack are rotatable through 180° in their bearings.

In testimony whereof I affix my signature.

CARL HIRSCH.